US009360950B2

(12) United States Patent
Chang

(10) Patent No.: US 9,360,950 B2
(45) Date of Patent: Jun. 7, 2016

(54) KEY CONTROL DEVICE FOR CLICK PAD

(75) Inventor: Fang-Ta Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 904 days.

(21) Appl. No.: 13/613,116

(22) Filed: Sep. 13, 2012

(65) Prior Publication Data
US 2014/0015754 A1 Jan. 16, 2014

(30) Foreign Application Priority Data

Jul. 10, 2012 (TW) .............................. 101124846 A

(51) Int. Cl.
H01H 13/70 (2006.01)
G06F 3/0354 (2013.01)
H01H 13/84 (2006.01)
G06F 3/0362 (2013.01)

(52) U.S. Cl.
CPC .......... G06F 3/03547 (2013.01); G06F 3/0362 (2013.01); H01H 13/84 (2013.01); H01H 2217/004 (2013.01); H01H 2217/012 (2013.01); H01H 2221/024 (2013.01); H01H 2221/078 (2013.01)

(58) Field of Classification Search
CPC ............ H01H 13/84; H01H 2221/024; H01H 2221/078; H01H 2221/012; H01H 2221/004; G06F 3/03547; G06F 3/0362
USPC .......................................................... 200/343
See application file for complete search history.

(56) References Cited

U.S. PATENT DOCUMENTS

| 7,119,291 B2* | 10/2006 | Sun ............................... 200/5 A |
| 2011/0254786 A1* | 10/2011 | Wen et al. ...................... 345/173 |
| 2012/0182236 A1* | 7/2012 | Tsai et al. ...................... 345/173 |

* cited by examiner

Primary Examiner — Renee Luebke
Assistant Examiner — Lheiren Mae A Caroc
(74) Attorney, Agent, or Firm — Rosenberg, Klein & Lee

(57) ABSTRACT

A key control device for a click pad is provided that includes a first driving member, a second driving member, a first connecting rod, and a second connecting rod. When the first driving member is pressed, it drives the first connecting rod for activating the key functions of the click pad. When the second driving member is pressed, it drives the second connecting rod and drives the first driving member to drive the first connecting rod to recover to the original position for shutting down the key functions of the click pad. The key control device controls the activation or shutdown of the key functions of the click pad. Because the key control device is hidden below a click pad of a notebook computer, the appearance of an electronic device is not effected.

15 Claims, 8 Drawing Sheets

KEY CONTROL DEVICE FOR CLICK PAD

FIELD OF THE DISCLOSURE

The present disclosure relates generally to a control device for click pad, and particularly to a key control device for the click pad on notebook computers.

BACKGROUND OF THE DISCLOSURE

With rapid advancement or technologies, modern electronic products are fast developing, and thus bringing people great convenience and improving their living qualities. This is especially true for the portable electronic products paying attention on compactness and lightness, for example, notebook computer, personal digital assistants, and mobile phones. Most current electronic products requiring input information need input devices such as keyboards and mice. Because the input devices described above do not comply with the development trend of simplicity and lightness, a new-generation input device, touch pad, has been widely applied to various electronic products for replacing the original input devices. A touch pad has a touch region corresponding to the display area of the display of the electronic product. Thereby, by sliding or touching the touch region of the touch pad using his finger or a stylus, a user can operate all the functional icons displayed on the display of the electronic product and hence controlling the electronic product to execute the corresponding functions.

The touch pad according to prior art has the touch functions of moving cursor and controlling windows only. A current touch pad already has the key functions equivalent to the left and right keys of a mouse. Nonetheless, when a user uses the touch functions of a click pad for browsing, he could possibly press the click pad and activate the key functions falsely, resulting in interruption of browsing.

Accordingly, the present disclosure provides a key control device for click pad. By using the key control device according to the present disclosure, the key functions of the click pad can be shut down or activated for avoiding activating the key functions of the click pad falsely during browsing using the touch functions of the click pad on a notebook computer and interrupting the browse.

SUMMARY

An objective of the present disclosure is to provide a key control device for click pad applicable to a click pad of a notebook computer and controlling the activation or shutdown of the key functions of the click pad. While using the touch functions of the click pad only, the key functions of the click pad can be shut down temporarily for avoiding activating the key functions of the click pad falsely while using the touch functions of the click pad.

Another objective of the present disclosure is to provide a key control device for click pad. The key control device is disposed below the click pad for not influencing the appearance of the electronic device.

The present disclosure provides a key control device for click pad disposed in a keyboard housing of a notebook computer and corresponding to a click pad, below which the key control device is disposed. The key control device comprises a first driving member, a second driving member, a first connecting rod, and a second connecting rod. The first driving member is disposed at a first positioning part the keyboard housing. The second driving member is disposed at a second positioning part of the keyboard housing and opposite to the first driving member. The first connecting rod has a pivot part, which is connected pivotally to a fixing base of the keyboard housing. The first connecting rod is opposite to the clock pad. A first end of the first connecting rod corresponds to an electrical switch of the click pad. The second connecting rod has a first end and a second end. The first end of the second connecting rod passes above the second positioning part. The second end of the second connecting rod is wedged in the first positioning part and located on the same side of the first connecting rod. The second connecting rod has a third positioning part against the second driving member.

DETAILED DESCRIPTION

In order to make the structure and characteristics as well as the effectiveness of the present disclosure to be further understood and recognized, the detailed description of the present disclosure is provided as follows along with embodiments and accompanying figures.

The click pad on a notebook computer according to prior art has the touch functions of moving cursor and controlling windows and the key functions equivalent to the left and right keys of a mouse. Nonetheless, when a user uses the touch functions of a click pad for browsing, he could possibly press the click pad and activate the key functions falsely, resulting in interruption of browsing. Accordingly, the present disclosure provides a key control device for click pad. By using the key control device according to the present disclosure, the key functions of the click pad can be shut down or activated for avoiding activating the key functions of the click pad falsely during browsing using the touch functions of the click pad on as notebook computer and interrupting the browse.

FIGS. 1 to 3A show an exterior view and exploded views of the click pad according as first embodiment of the present disclosure. As shown in the figure, the present embodiment provides a key control device 1, which mainly controls the activation or shutdown of the key functions of a click pad 21 of a notebook computer 2. The key control device 1 according to the present embodiment is disposed in the click pad 21 of the notebook computer 2 and can be hidden below the click pad 21 for not influencing the current appearance of the notebook computer 2, as shown the region A in FIG. 1.

Figure 1:
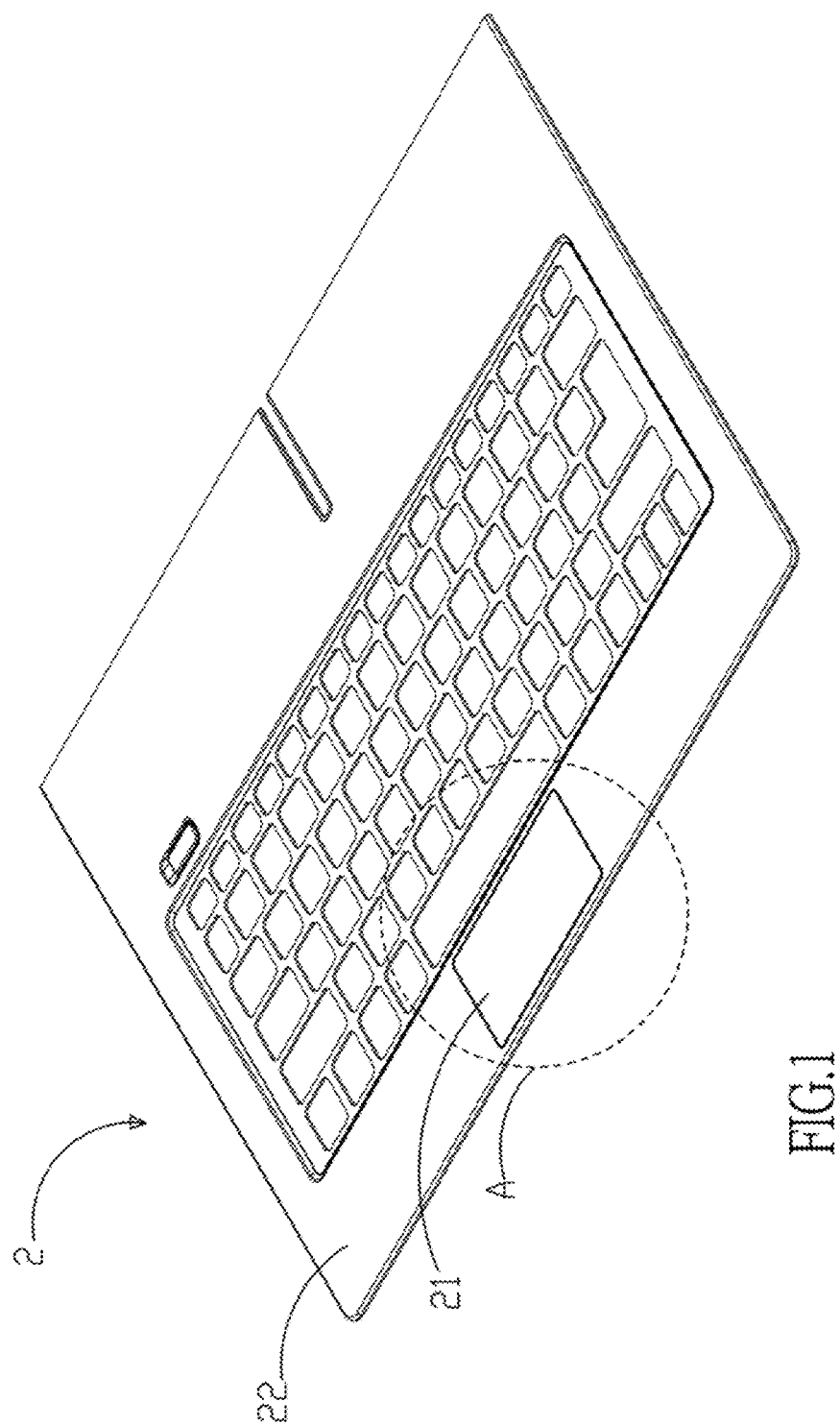
FIG. 1 shows an exterior view of the click pad according the first embodiment of the present disclosure.
Figure 2:
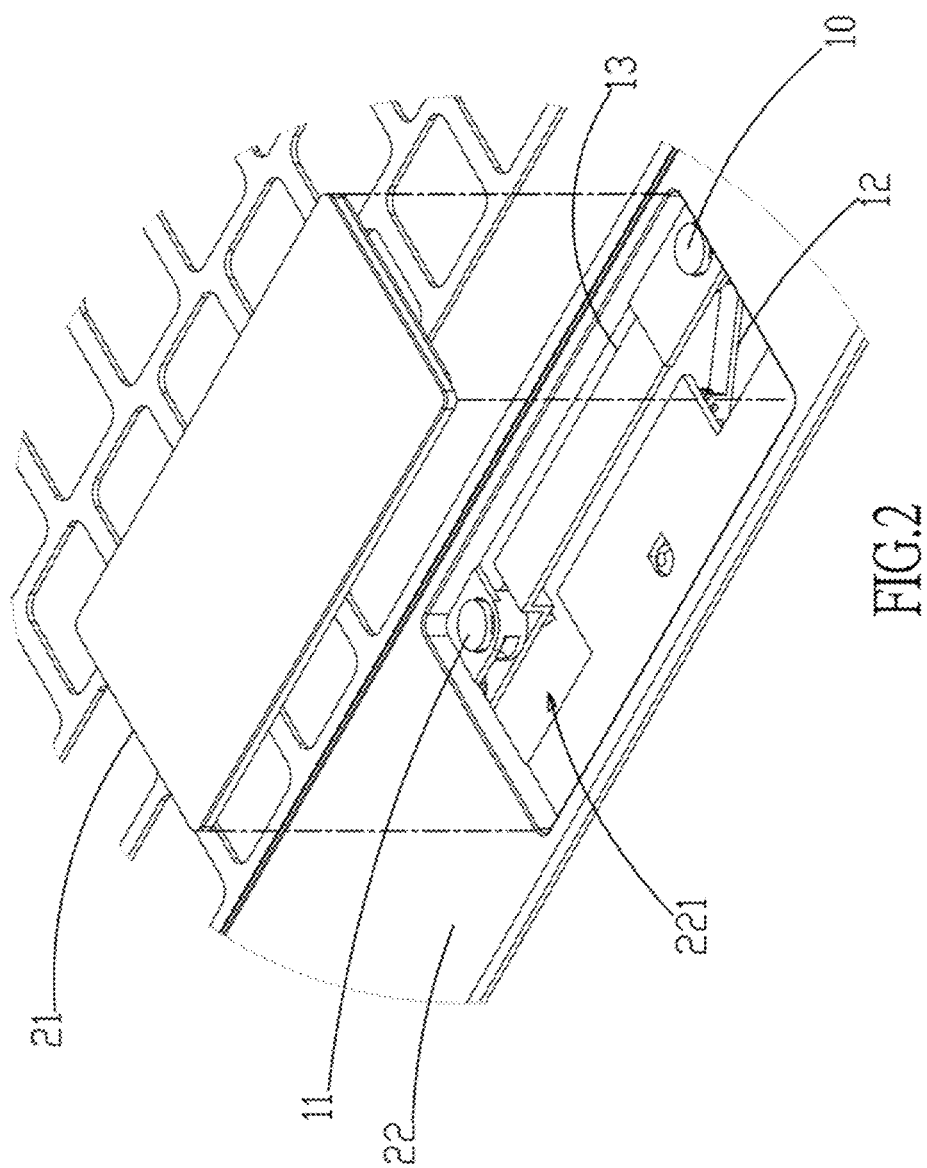
FIG. 2 shows an exploded view of the key control device according to the region A in FIG. 1 of the present disclosure.
Figure 3A:
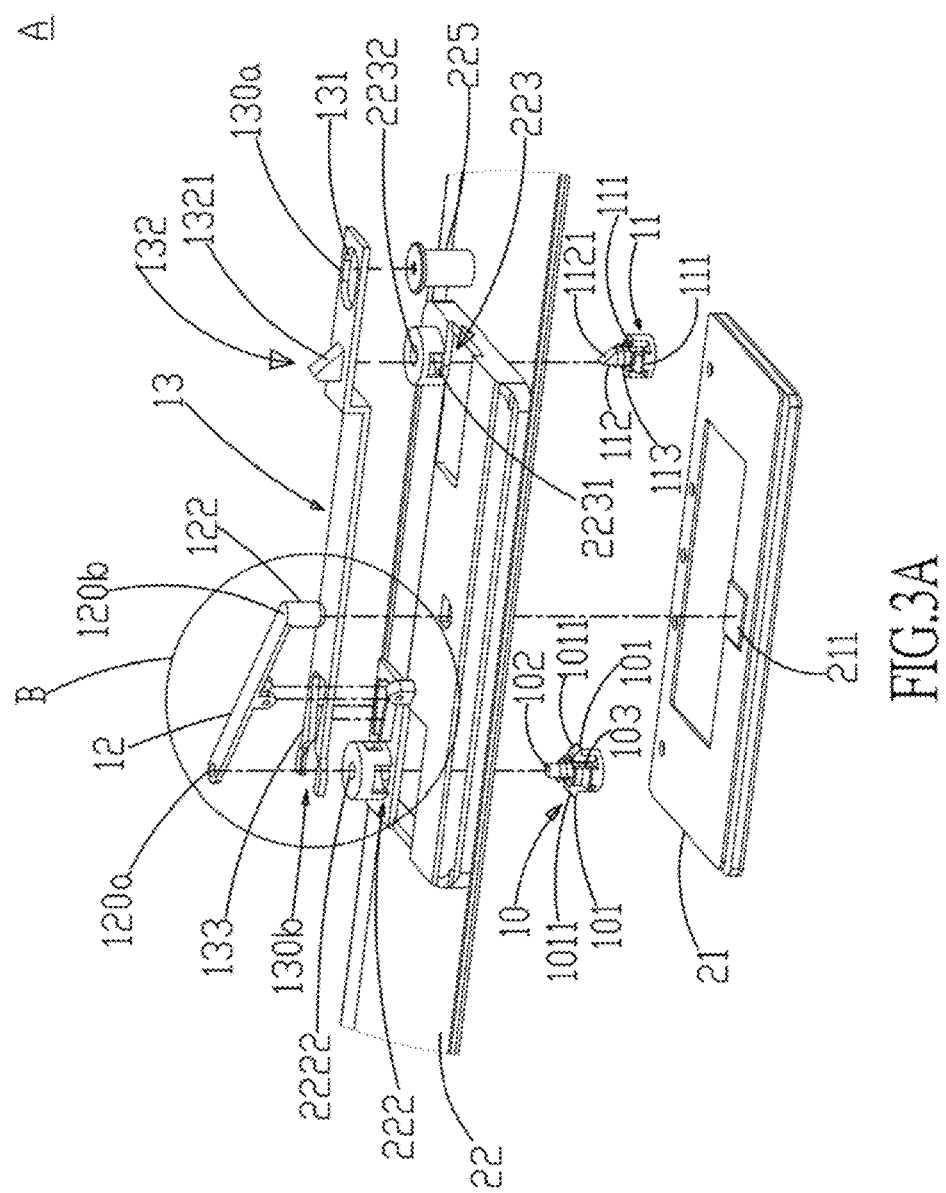
FIG. 3A shows another exploded view of the key control device according to the region A in FIG. 1 of the present disclosure.
Figure 3B:
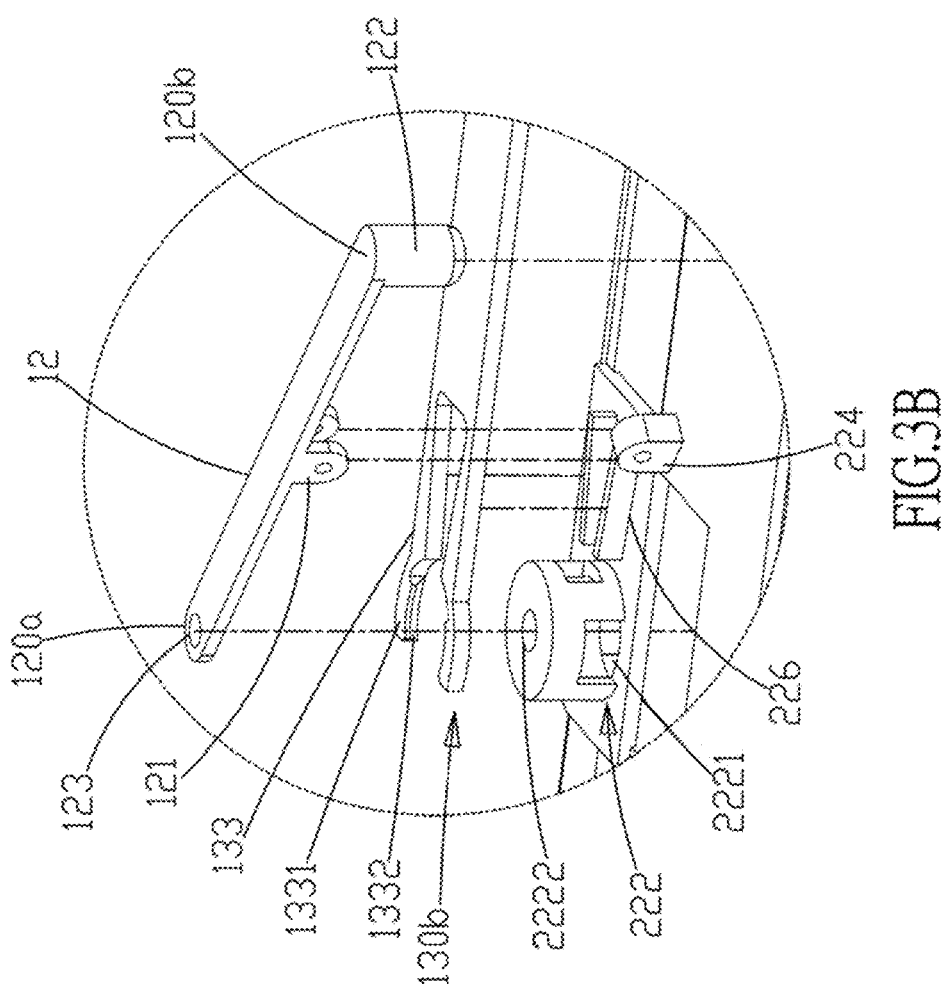
FIG. 3B shows a partial enlarged drawing of the key control device according to the region B in FIG. 3A of the present disclosure.

The key control device 1 according to the present embodiment is assembled below the click pad 21 of the notebook computer 2. The notebook computer 2 has a keyboard housing 22, which includes an opening 221. The click pad 21 is accommodated in the opening 221. FIG. 1 and FIG. 2 are viewed from the front side of the keyboard housing 22, while FIG. 3A is viewed from the backside of the keyboard housing 22. For describing the key control device 1 according to the present embodiment clearly, the viewing angle adopted by FIG. 3A is used for description. FIG. 3B shows a partial enlarged drawing of the key control device according to the region B in FIG. 3A. The keyboard housing 22 further has a first positioning part 222, a second positioning part 223, a fixing base 224, and a limiting member 225. The first positioning part 222, the second positioning part 223, and the fixing base 224 are located in the opening 221. The first and second positioning parts 222, 223 are located on and connected with the left and right sides of the opening 221, respectively. The fixing base 224 is located at the center of the opening 221 and connected with the bottom side of the opening 221. The limiting member 225 is located on the outer side of the opening 221 and adjacent to the second positioning part 223. In addition, the limiting member 225, the first positioning part 222, and the second positioning part 223 are aligned.

The key control device 1 according to the present embodiment comprises a first driving member 10, a second driving member 11, a first connecting rod 12, and a second connecting rod 13. The first driving member 10 is disposed at the first positioning part 222 of the keyboard housing 22; the second driving member 11 is disposed at the second positioning part of the keyboard housing 22. There is a pivot pan 121 between both ends of the first connecting rod 12. The pivot part 121 is connected pivotally to the fixing base 224. Thereby, the first connecting rod 12 can pivot on the fixing base 224. The first connecting rod 12 has a first end 120a and a second end 120b. The first end 120a of the first connecting rod 12 connects to the end of the first driving member 10; the second end 120b of the first connecting rod 12 has a pressing projecting part 122 corresponding to an electrical switch 211 of the click pad 21. The second connecting rod 13 also has a first end 130a and a second end 130b. The first end 130a has a limiting hole 131 disposed around the limiting member 225. Thereby, the second connecting rod 13 cannot escape from the limiting member 225. The second connecting rod 13 passes over the second positioning part 223; the second end 130b of the second connecting rod 13 is wedged in the first positioning part 222. Besides, the second connecting rod 13 has a third positioning part 132. The end of the second driving member 11 is disposed at the third positioning part 132.

Figure 4:
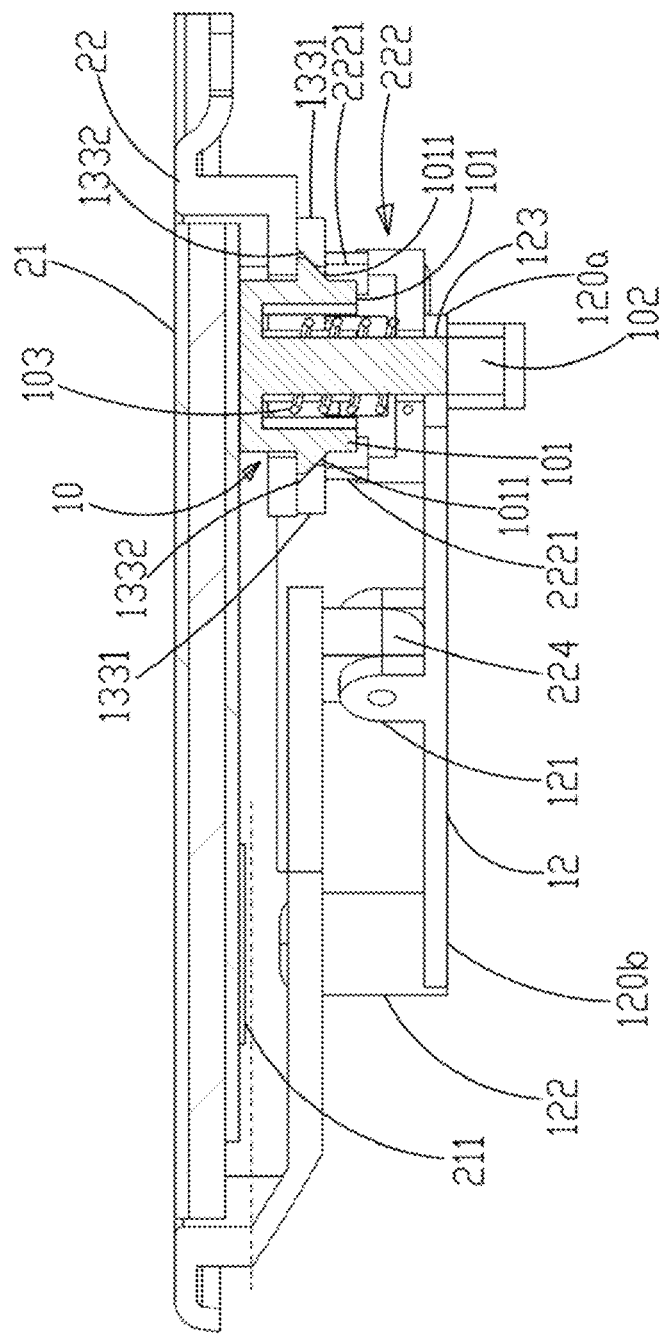
FIG. 4 shows a partial cross-sectional view of the key control device according to the first embodiment of the present disclosure.

FIG. 4 shows a partial cross-sectional view of the key control device according to the first embodiment of the present disclosure. As shown in the figure, the present embodiment discloses loses the connected structures of the first driving member 10 and the first positioning part 222, and of the first connecting rod 12 and the second connecting rod 13. The first driving member 10 according to the present embodiment has a plurality of first hook parts 101 and a first driving pillar 102. The plurality of hook parts 101 are disposed around the first driving pillar 102. The first positioning part 222 has a plurality of first positioning sliding grooves 2221 and a first guiding hole 2222. The plurality of first hook parts 101 of the first driving member 10 are disposed in the plurality of first positioning sliding grooves 2221 of the first positioning part 222. The first driving pillar 102 of the first driving member passes through the first guiding hole 2222. In addition, the first end 120a of the first connecting rod 12 has a connecting hole 123. After the first driving pillar 102 passes through the first guiding hole 2222 of the first positioning part 222, the first driving pillar 102 passes through the connecting hole 123.

The second end 130b of the first positioning part 222, at which the second connecting rod 13 is wedged, has two elastic arms 133. Each of the elastic arms 133 has a positioning projecting part 1331 at its end. The positioning projecting part 1331 is disposed in the corresponding first positioning sliding groove 2221 of the first positioning part 222 and supports the corresponding first hook part 101 of the first driving member 10. Each first hook part 101 of the first driving member 10 has a first guiding slope 1011. Each positioning projecting part 1331 also has a second guiding slope 1332. The first guiding slope 1011 or the first hook part 101 is against and connected with the second guiding slope 1332 of the positioning projecting part 1331. Moreover, the keyboard housing 22 further has at least a limiting projecting part 226 located on the side of the first positioning part 222 close to the second connecting rod 13. The two elastic arms 133 of the second connecting rod 13 clip the limiting projecting part 226 for limiting the moving range the two elastic arms 133 of the second connecting rod 13.

Figure 5:
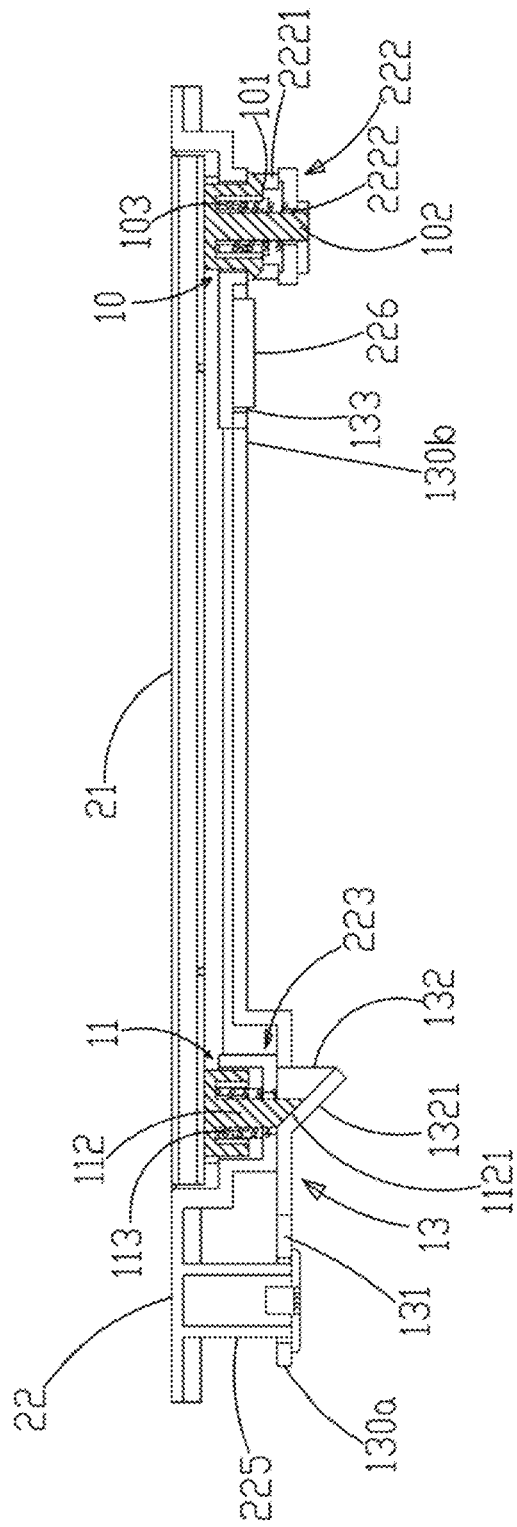
FIG. 5 shows another partial cross-sectional view of the key control device according to the first embodiment of the present disclosure.

FIG. 5 shows another partial cross-sectional view of the key control device according to the first embodiment of the present disclosure. As shown in the figure, the present embodiment discloses the connected structures of the second driving member 11 and the second positioning part 223, and of the second driving member 11 and the second connecting rod 13. The connected structure of the second driving member 11 and the second positioning part 223 according to the present embodiment is identical to that of the first driving member 10 and the first positioning part 222 according to the present embodiment. The second driving member 11 also has a plurality of second hook parts 111 and a second driving pillar 112. The second positioning part 223 has a plurality of second positioning sliding grooves 2231 and a second guiding hole 2232. When the second driving member 11 is disposed at the second positioning part 223 the plurality of second hook parts 111 of the second driving member 11 are disposed in the plurality of second positioning sliding grooves 2232 and the second driving pillar 112 passes through the second guiding hole 2232. The end of the second driving pillar 112 is disposed at the third positioning part 132 of the second connecting rod 13 and has to first slope 1121. The third positioning part 132 of the second connecting rod 13 has a second slope 1321. The first slope 1121 of the second driving pillar 112 is against the second slope 1321 of the third positioning part 132.

Figure 6:
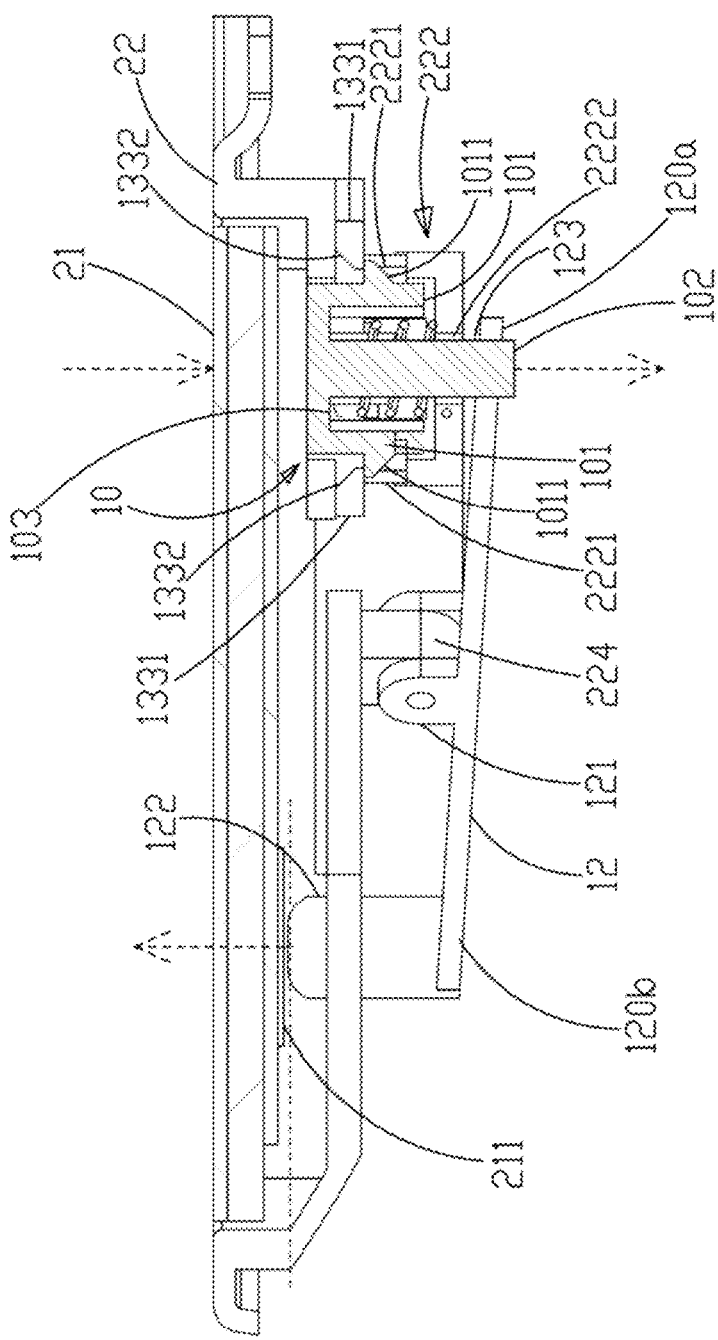
FIG. 6 shows a usage status diagram of the key control device according to the first embodiment of the present disclosure.

In FIG. 6, the first driving member 10 is pressed for activating the key functions of the click pad 21. It is shown in Figure that the first driving member 10 according to the present embodiment is located on the upper right corner of the click pad 21 and hidden below the click pad 21. When the upper right corner of the click pad 21 is pressed, the first driving member 10 is pressed at the same time. The applied pressure on the first driving member 10 moves it downwards. When the first driving member 10 moves downwards, the first guiding slope 1011 of the plurality of first hook parts 101 of the first driving member 10 moves relative to the second guiding slope 1332 of the positioning projecting part 1331 of the second connecting rod 13. The plurality of first hook parts 101 of the first driving member 10 moves to the bottom the positioning projecting part 1331. At this time, the first driving pillar 102 passes through the first guiding hole 2222 of the first positioning part 222 and moves downwards, and thus driving the first connecting rod 12 and the first end 120a connected with the first driving pillar 101 to move downwards. The first connecting rod 12 pivots on the fixing base 224, moving the second end 120b, which has the pressing projecting part 122, of the first connecting rod 12 upwards. The tip of the pressing projecting part 122 will be just located at the lowest point to which the click pad 21 can deform downwards. Namely, the tip of the pressing projecting part 122 is located on the dashed line in FIG. 6. Alternatively, the tip of the pressing projecting part 122 will exceed the lowest point to which the click pad 21 can deform downwards. Namely, the tip of the pressing projecting part 122 exceeds the dashed line and is located above the dashed line in FIG. 6. When the user presses the click pad 21, the click pad 21 deforms downwards. The electrical switch 211 of the click pad 21 contacts with the pressing projecting part 122. The pressing projecting part 22 supports the click pas 21 so that the key functions of the click pad 21 can be pressed for use. Hence, the key functions of the click pad 21 can be activated.

Refer again to FIG. 4. The first driving member 10 according to the present embodiment further comprises a first elastic body 103, for example, a spring. The first elastic body 103 slips around the first driving pillar 102 of the first driving member 10. One end the first elastic body 103 is against the first driving member 10, while the other end thereof is against the first positioning part 222. When the first hook part 101 of the first driving member 10 moves below the positioning projecting part 1331 of the second connecting rod 13, pressure will be applied to the first driving member 10 continuously to move the first driving member 10 downwards and compress the first elastic body 103. After the force is stopped from applying on the first driving member 10, the first elastic body 103 produces a reacting force, which pushes the first driving member 10 upwards and makes the first hook part 101 of the first driving member 10 push the positioning projecting part 1331 of the second connecting rod 13.

Figure 7:
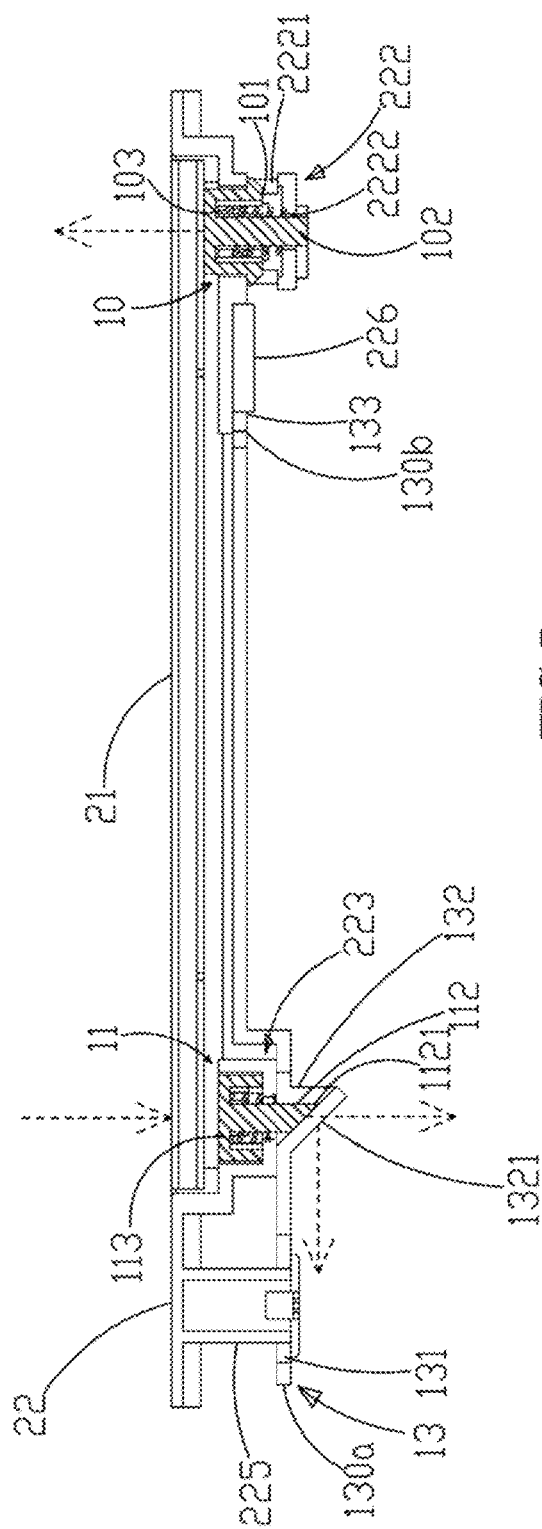
FIG. 7 shows another usage status diagram of the key control device according to the first embodiment of the present disclosure.

In FIG. 7, the second driving member 11 is pressed for shutting down the key functions of the click pad 21. As shown in FIG. 1, the second driving member 11 is located below the click pad 21 and on the upper 101 corner of the opening 221 of the click pad 21. When the upper left corner of the click pad 21 is pressed, the second driving member 11 is pressed. Then the plurality of second hook parts 111 of the second driving member 11 move downwards along the plurality of second positioning sliding grooves 2231. The second driving pillar 112 of the second driving member 11 passes through the second guiding hole 2232 and pushes toward the direction of the third positioning part 132 of the second connecting rod 13. When the second driving pillar 112 moves downwards, the first slope 1121 of the second driving pillar 112 pushes the second slope 1321 of the third positioning part 132 and moves the third positioning part 132 to the left, which moves the second connecting rod 13 to move to the left. When the second connecting rod 13 moves to the left, the limiting member 225 of the keyboard housing 22 can function in coordination with the limiting hole 131 of the second connecting rod 13 for avoiding excess displacement of the second connecting rod 13.

Meanwhile, the two elastic arms 133 of the second connecting rod 13 move to the left and are limited by the limiting projecting part 226 of the keyboard housing 22. The two positioning projecting parts 1331 are propped open towards the outer sides of the plurality of first positioning sliding grooves 2222 of the first positioning part 222, respectively. The first driving member 10 uses the reacting force of the first elastic body 103 to recover to the original position and make the pressing projecting part 122 of the first connecting rod 12 away from the electrical switch 211 of the click pad 21 and hidden in the keyboard housing 22. In other words, the tip of the pressing projecting part 122 is lower than the lowest point to which the click pad 21 can deform downwards, as shown in FIG. 4. As the click pad 21 is pressed downwards, the click pad 21 deforms downwards but not contacting the pressing projecting part 122. Thereby the pressing projecting part 122 cannot support the click pas 21 and thus disabling the use of the key functions of the click pad 21. Hence, the key functions of the click pad 21 are shut down. While stopping applying force on the second driving member 11, the second driving member 11 moves upwards and recovers to its original position. The two pressing projecting parts 132 of the second connecting rod 13 are wedged in the corresponding first positioning sliding grooves 2222 of the first positioning part 222, respectively, and support the bottom of the plurality of first hook parts 121 of the first connecting rod 12, as shown in FIG. 4.

Refer again to FIG. 5. The second driving member 11 further includes a second elastic body 113 slipping over the second driving pillar 112 of the second driving member 11. An end of the second elastic body 113 is against the second driving member 11 while the other end thereof is against the second positioning part 223. When pressure is applied to the second driving member 11, the second driving member 11 moves downwards and compresses the second elastic body 113. When the pressure on the second driving member 11 is stopped, the second elastic body 113 produces a reacting force caused by compression. The reacting three pushes the second driving member 11 for recovering the second driving member 11 to its original position.

To sum up, the present disclosure relates to a key control device for click pad. The key control device is disposed below the click pad for maintaining aesthetic appearance of the electronic device. The key control device according to the present disclosure comprises the first driving member, the second driving member, the first connecting rod, and the second connecting rod. By means of the click pad, the user presses the first driving member on one side of the click pad. The first driving member drives the first connecting rod for activating the key functions of the click pad. The user can also press the second driving member on the other side of the click pad by means of the click pad. The second driving member drives the second connecting rod, which makes the first driving member drive the first connecting rod to recover to the original position for shutting down the key functions of the click pad. Thereby, by using the key control device according to the present disclosure, the activation and shutdown of the key functions of the click pad can be controlled for avoiding the user activating the key functions of the click pad falsely while using the touch functions thereof.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. A key control device for click pad, disposed in a keyboard housing of a notebook computer and corresponding to a click pad, disposed below said click pad, and comprising:
   a first driving member, disposed at a first positioning part of said keyboard housing;
   a second driving member, disposed at a second positioning part of said keyboard housing, and opposite to said first driving member;

a first connecting rod, having a pivot part connected pivotally to a fixing base of said keyboard housing, opposite to said click pad, having a first end connected to said first driving member, having a second end corresponding to an electrical switch of said click pad; and a second connecting rod, having a first end and a second end, said first end thereof movably disposed at a limiting member of said keyboard housing, passing over said second positioning part, said second end thereof movably wedged in said first positioning part and on the same side of said first connecting rod, and having a third positioning part against said second driving member.

2. The key control device for click pad of claim 1, wherein said keyboard housing has an opening for accommodating said click pad, and said first driving member, said second driving member, said first connecting rod, and said second connecting rod are located in said opening.

3. The key control device for click pad of claim 1, wherein said first driving member has a plurality of first hook parts and a first driving pillar; said plurality of first hook parts surround said first driving pillar and slide along a plurality of first positioning sliding grooves of said first positioning part; and said first driving pillar passes through a first guiding hole of said first positioning part and connects with said first end of said first connecting rod.

4. The key control device for click pad of claim 3, wherein said second end of said first connecting rod has a pressing projecting part; said first driving member moves downwards, driving said first end of said first connecting rod to move downwards and driving said second end of said first connecting rod having said pressing projecting part to move upwards; and said pressing projecting part presses said electrical switch of said click pad.

5. The key control device for click pad of claim 3, wherein said second driving member has a plurality of second hook parts and a second driving pillar; said plurality of second hook parts surround said first driving pillar and slide along a plurality of second positioning sliding grooves of said first driving pillar; said first driving pillar passes through a second guiding hole of said second positioning part and connects with said third positioning part of said second connecting rod.

6. The key control device for click pad of claim 3, wherein said first end of said first connecting rod has a connecting hole for passing through by said first driving pillar.

7. The key control device for click pad of claim 3, wherein said second end of said second connecting rod has two elastic arms; each of said elastic arms has a positioning projecting part at its end; and said positioning projecting part is wedged in said corresponding first positioning sliding groove.

8. The key control device for click pad of claim 7, wherein said two elastic arms are wedged in a limiting projecting part of said keyboard housing.

9. The key control device for click pad of claim 7, wherein said first hook part of said first driving member has a first guiding slope; said positioning projecting part has a second guiding slope corresponding to said first guiding slope; and said first driving member moves downwards, said first guiding slope of said first hook part moves relative to said second guiding slope of said positioning projecting part for moving said first hook part to the bottom of said positioning projecting part.

10. The key control device for click pad of claim 7, and further comprising a first elastic body, slipping around said first driving pillar of said first driving member and located between said first driving member and said first positioning part.

11. The key control device for click pad of claim 1, wherein said second end of said first connecting rod has a pressing projecting part; said first driving member moves downwards, driving said first end of said first connecting rod to move downwards and driving said second end of said first connecting rod having said pressing projecting part to move upwards; and said pressing projecting part presses said electrical switch of said click pad.

12. The key control device for click pad of claim 1, wherein said second driving member has a plurality of second hook parts and a second driving pillar; said plurality of second hook parts surround said second driving pillar and slide along a plurality of second positioning sliding grooves of said second driving pillar; said second driving pillar passes through a second guiding hole of said second positioning part and connects with said third positioning part of said second connecting rod.

13. The key control device for click pad of claim 12, wherein the end of said second driving pillar has a first slope against a second slope of said third positioning part; and said second driving member moves up or down, said first slope of said second driving pillar moves relative to said second slope of said third positioning part and pushes said second connecting rod to move along the line connecting said first positioning part and said limiting member.

14. The key control device for click pad of claim 12, and further comprising a second elastic body, slipping around said second driving pillar of said second driving member and located between said second driving member and said second positioning part.

15. The key control device for click pad of claim 1, wherein said first end of said second connecting rod has a limiting hole disposed at said limiting member.

* * * * *